(12) United States Patent
Cha

(10) Patent No.: US 11,114,901 B2
(45) Date of Patent: Sep. 7, 2021

(54) CRADLE DEVICE HAVING WIRELESS CHARGING FUNCTION

(71) Applicant: CNA CO., LTD., Suwon-si (KR)

(72) Inventor: Dongsu Cha, Hwaseong-si (KR)

(73) Assignee: CNA CO., LTD., Suwon-si (KR)

( * ) Notice: Subject to any disclaimer, the term of this patent is extended or adjusted under 35 U.S.C. 154(b) by 121 days.

(21) Appl. No.: 16/088,527

(22) PCT Filed: Jun. 27, 2017

(86) PCT No.: PCT/KR2017/006739
§ 371 (c)(1),
(2) Date: Sep. 26, 2018

(87) PCT Pub. No.: WO2018/008882
PCT Pub. Date: Jan. 11, 2018

(65) Prior Publication Data
US 2019/0123575 A1    Apr. 25, 2019

(30) Foreign Application Priority Data

Jul. 5, 2016  (KR) .................. 10-2016-0084677

(51) Int. Cl.
*H02J 50/80* (2016.01)
*H04M 1/04* (2006.01)
(Continued)

(52) U.S. Cl.
CPC ............. *H02J 50/80* (2016.02); *H02J 50/10* (2016.02); *H04M 1/04* (2013.01);
(Continued)

(58) Field of Classification Search
CPC ....................... H04B 5/0037; B60L 53/12–126
See application file for complete search history.

(56) References Cited

U.S. PATENT DOCUMENTS

| 2007/0069687 A1* | 3/2007 | Suzuki | H02J 7/025 320/108 |
| 2009/0021219 A1* | 1/2009 | Yoda | H02J 7/00 320/137 |

(Continued)

FOREIGN PATENT DOCUMENTS

| JP | 2014-071849 A | 4/2014 |
| KR | 10-2013-0092084 A | 8/2013 |

(Continued)

OTHER PUBLICATIONS

"Near field communication", Jun. 1, 2016, Wikipedia, retrieved via Wayback machine at <https://web.archive.org/web/20160601113118/https://en.wikipedia.org/wiki/Near-field_communication> (Year: 2016).*

(Continued)

*Primary Examiner* — Daniel Cavallari
*Assistant Examiner* — David A Shiao
(74) *Attorney, Agent, or Firm* — Maschoff Brennan

(57) ABSTRACT

A cradle device for providing a wireless charging function according to the present invention comprises: a cradle part provided for being mobile terminal-mountable; a wireless charging module which is disposed inside the cradle part and includes a transmitting coil, a switching part for switching a connecting passage between an external power supply and the transmitting coil, and a control part for controlling the switching part; and an NFC tag coupled to the wireless charging module, wherein, when receiving a tag recognition signal from the NFC tag, the control part performs a turn-on control of the switching part. According to the present invention, the cradle device can simultaneously provide a mobile terminal with a wireless charging function and a user via the mobile terminal with various contents provided through NFC tag information.

4 Claims, 3 Drawing Sheets

(51) Int. Cl.
 H02J 50/10 (2016.01)
 G06K 7/10 (2006.01)
 H04B 5/00 (2006.01)
 H02J 50/90 (2016.01)
 H02J 7/00 (2006.01)

(52) U.S. Cl.
 CPC ........ *G06K 7/10158* (2013.01); *H02J 7/0042* (2013.01); *H02J 50/90* (2016.02); *H04B 5/0037* (2013.01)

(56) References Cited

U.S. PATENT DOCUMENTS

| | | | | |
|---|---|---|---|---|
| 2011/0025264 A1* | 2/2011 | Mochida | ................. | H02J 50/10 320/108 |
| 2012/0315843 A1* | 12/2012 | Cox | ................. | H04W 52/0274 455/41.1 |
| 2014/0089095 A1* | 3/2014 | Bennett | ............. | G06Q 30/0271 705/14.64 |
| 2014/0197687 A1* | 7/2014 | Lin | ......................... | H02J 50/40 307/31 |
| 2014/0235164 A1* | 8/2014 | Vaucher | ................. | H02J 50/80 455/41.1 |
| 2014/0361735 A1* | 12/2014 | Li | ........................... | H02J 50/12 320/108 |
| 2015/0244176 A1* | 8/2015 | Van Den Brink | ...... | H02J 7/342 307/104 |
| 2015/0256965 A1* | 9/2015 | Kobayashi | ............ | H04W 12/06 455/11.1 |
| 2016/0211703 A1* | 7/2016 | Eguchi | .................... | H02J 50/40 |
| 2019/0028149 A1* | 1/2019 | Pifferi | ..................... | H02J 7/025 |

FOREIGN PATENT DOCUMENTS

| | | |
|---|---|---|
| KR | 10-2013-0096326 A | 8/2013 |
| KR | 10-2015-0134448 A | 12/2015 |
| KR | 10-2016-0041473 A | 4/2016 |

OTHER PUBLICATIONS

KR Office Action dated Sep. 22, 2016 as received in Application No. 10-2016-0084677.
KR Office Action dated Feb. 27, 2017 as received in Application No. 10-2016-0084677.

* cited by examiner

CRADLE DEVICE HAVING WIRELESS CHARGING FUNCTION

TECHNICAL FIELD

Embodiments of the present invention relate to a cradle device having a wireless charging function, and more particularly, to a cradle device having a wireless charging function, which is capable of wirelessly charging a portable terminal and providing a variety of content through the portable terminal while being charged.

BACKGROUND ART

The near field communication (NFC) tag is one of the radio frequency identification technologies and a contactless communication technology that uses a frequency band of 13.56 MHz and transmits and receives various wireless data at a close distance of within 10 cm. NFC has a short communication range, thus providing relatively high security and is inexpensive, and thus is drawing attention as next-generation near field communication technology.

The NFC tag consists of a very small chip and an antenna for transmitting and receiving data, and in general, can be broadly classified into a tetragonal NFC tag and a circular NFC tag according to the shape of an antenna.

Antennas for the NFC tags differ in transmission/reception distances and performance depending on the shape and size thereof. When an antenna of an NFC tag has a circular shape rather than a tetragonal shape, transmission/reception rates are better, and the bigger the size of the antenna, the higher the transmission/reception rates.

Meanwhile, when a sticker of such an NFC tag is brought into contact with a smartphone, it accesses to a dedicated application without a separate access procedure, and thus the sticker is widely used not only for payment but also for transmission of product information in general stores or travel information for visitors, and in transportation, access control locking devices, and the like.

In addition, recently, a user has watched a variety of multimedia through a mobile device, and thus battery capacity of the mobile device is insufficient. Accordingly, users experience inconveniences such as having to carry a separate auxiliary battery and a request for charging a mobile phone in a store or the like. Therefore, companies that provide wireless charging devices on a table or the like of a store or the like have recently emerged. Such a wireless charging device communicates with a mobile device adjacent to the corresponding wireless charging device, the corresponding wireless charging device transmits a charging signal to the mobile device, and in the mobile device, a battery included in the corresponding mobile device is charged based on the charging signal.

Meanwhile, it is necessary to utilize a method of providing users with the above-described wireless charging for free or at low cost, and also providing a mobile device with a variety of content using the above-described NFC tag, rather than simply providing the wireless charging function, as a marketing strategy.

DISCLOSURE

Technical Problem

Therefore, the present invention has been made in view of the above problems, and it is one object of the present invention to provide a cradle device including a wireless charging module and an NFC tag.

Other objects of the present invention will become apparent to those of ordinary skill in the art from the following embodiments.

Technical Solution

In accordance with one aspect of the present invention, provided is a cradle device including: a holder part configured to hold a mobile terminal; a wireless charging module provided in the holder part, and including a transmitter coil, a switching unit configured to switch connection paths between an external power supply and the transmitter coil, and a controller configured to control the switching unit; and an NFC tag coupled to the wireless charging module, wherein the controller controls the switching unit to be turned on upon receiving a tag recognition signal from the NFC tag.

The tag recognition signal may be an induced electromotive force signal generated from an antenna of the NFC tag in response to an RF signal transmitted from a tag recognition unit of the mobile terminal.

NFC tag information recognized by the tag recognition unit of the mobile terminal may be URL information of a homepage, and content provided in the URL information may include at least one piece of content selected from predetermined advertisement information, menu information of a store in which the cradle device is installed, event information provided by a store, and event information provided by a store in a region where the mobile terminal is located.

The cradle device may further include an LED configured to emit light by an induced electromotive force generated from the antenna of the NFC tag.

The cradle device may further include a speaker operated by an induced electromotive force generated from the antenna of the NFC tag.

The cradle device may further include, at one side of the holder part, a seating recognition unit configured to recognize whether or not the mobile terminal is seated, and after the switching unit is controlled to be turned on, the tag recognition signal may not be transmitted from the NFC tag, and when the seating recognition unit recognizes that the mobile terminal is not seated, the controller may control the switching unit to be turned off.

After the switching unit is controlled to be turned on, the controller may control the switching unit to be turned off after a predetermined period of time.

Advantageous Effects

As is apparent from the foregoing description, a cradle device can provide a mobile terminal with a wireless charging function, and can also provide a user with a variety of content provided through NFC tag information, through the mobile terminal.

MODE

Figure 1:
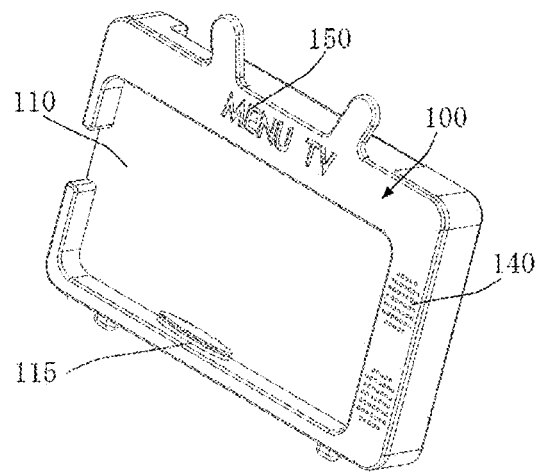
FIG. 1 is a perspective view of a cradle device according to an embodiment of the present invention.

Details of other embodiments will be provided below in the detailed description and the accompanying drawings.

Advantages, features, and methods of achieving the same of the present invention will become apparent from the following detailed embodiments with reference to the drawings. However, the present invention is not limited to the embodiments set forth herein, and may be embodied in many different forms. In the following description, when a certain element is referred to as being connected to another element, this includes a case in which the element is directly connected to the other element and also includes a case in which the two elements are electrically connected to each other with another element present therebetween. In addition, a detailed description of elements irrelevant to the present invention will not be provided herein so as to clearly explain the present invention, and like reference numerals denote like elements throughout the present specification.

Hereinafter, the present invention will be described with reference to the accompanying drawings.

Figure 2:
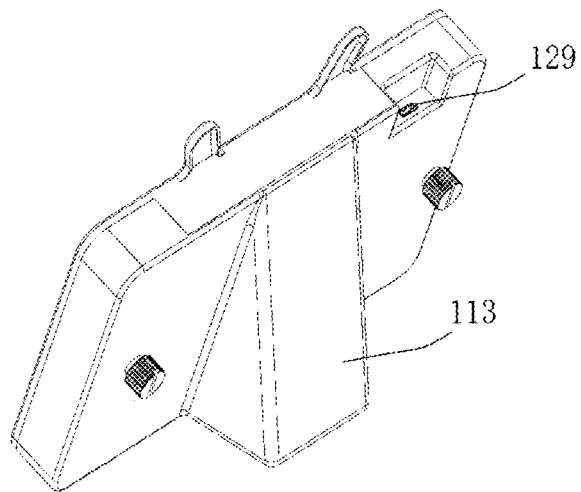
FIG. 2 is a perspective view of a cradle device to which a mobile terminal is coupled, according to an embodiment of the present invention.
Figure 3:
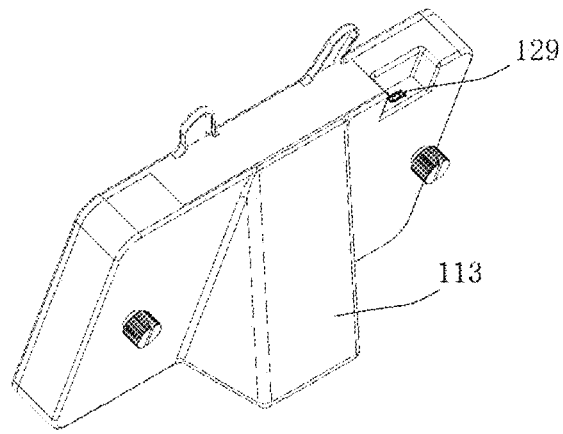
FIG. 3 is a perspective view of a cradle device according to an embodiment of the present invention viewed at another angle.
Figure 4:
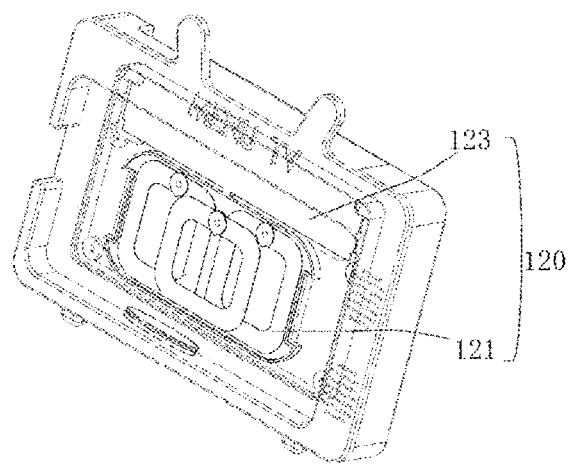
FIG. 4 is an exploded perspective view of a cradle device according to an embodiment of the present invention.
Figure 5:
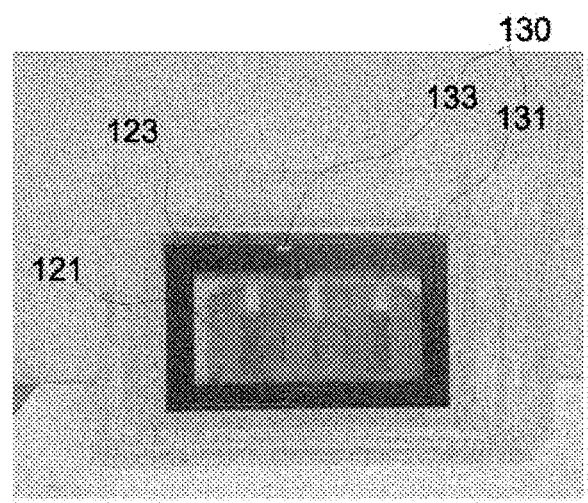
FIG. 5 illustrates an example of a real image showing a cradle device according to an embodiment of the present invention.

FIG. 1 is a perspective view of a cradle device according to an embodiment of the present invention. FIG. 2 is a perspective view of the cradle device to which a mobile terminal is coupled, according to an embodiment of the present invention. FIG. 3 is a perspective view of the cradle device according to an embodiment of the present invention viewed at another angle. FIG. 4 is an exploded perspective view of the cradle device according to an embodiment of the present invention. FIG. 5 illustrates an example of a real image showing the cradle device according to an embodiment of the present invention.

Referring to FIGS. 1 to 5, the cradle device 100 of the present invention may include a holder part 110 configured to hold a mobile terminal 200, a wireless charging module 120 installed in the holder part 110 and including a transmitter coil 121, a controller 123 including a circuit for controlling the transmitter coil 121, and a connection terminal 129 for an external power supply, an NFC tag 130 coupled to the wireless charging module 120 and including an antenna 131 configured to receive an RF signal transmitted from a tag recognition unit of the mobile terminal 200 and a chip 133 connected to the antenna 131 and configured to store data, a speaker 140, and an LED 150.

The wireless charging module 120 may be installed at a rear surface of the holder part 110 allowing the mobile terminal 200 to rest thereon, and the NFC tag 130 may be disposed between the holder part 110 and the wireless charging module 120. The antenna 131 of the NFC tag 130 may be formed into a tetragonal shape along edge surfaces of the wireless charging module 120, but the present invention is not limited thereto.

The wireless charging module 120 may include a contact terminal 127, and may transmit power of an external power supply 10 to the transmitter coil 121 through a cable connected via the contact terminal 127.

Figure 6:
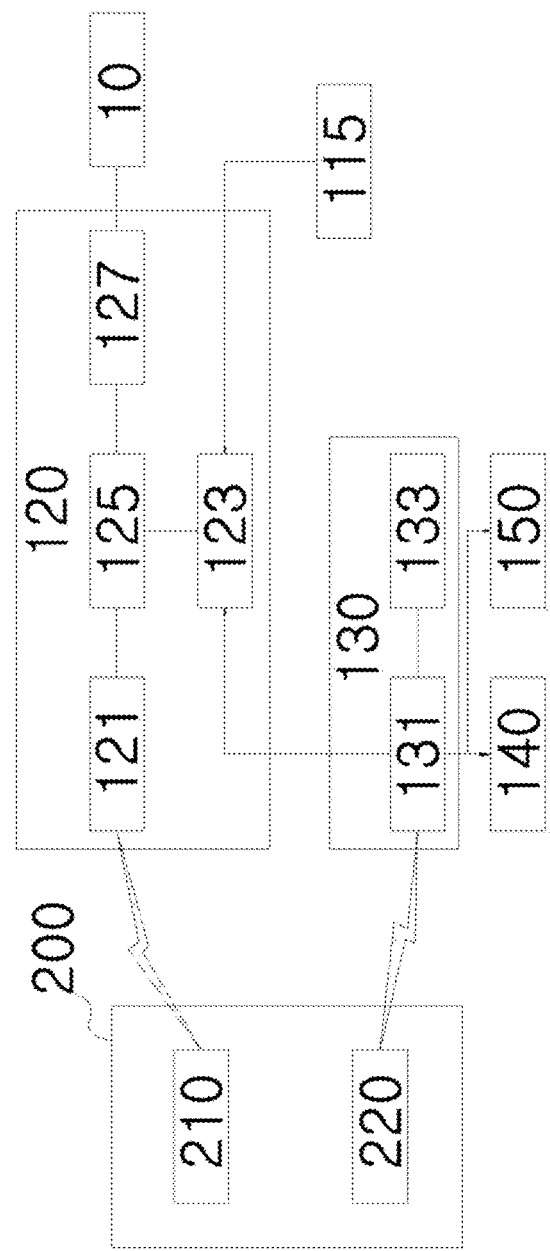
FIG. 6 is a block diagram for explaining an operation relationship between a wireless charging module, an NFC tag, and a mobile terminal of a cradle device according to an embodiment of the present invention.

FIG. 6 is a block diagram for explaining an operation relationship between the wireless charging module, the NFC tag, and the mobile terminal of a cradle device according to an embodiment of the present invention.

Referring to FIG. 6, the wireless charging module 120 may include the transmitter coil 121, the controller 123, a switching unit 125, and the contact terminal 127.

The transmitter coil 121 receives power transmitted via the contact terminal 127, and as the transmitter coil 121, a conventional general wireless charging transmitter may be used. In the mobile terminal 200, a receiver coil 210 magnetically coupled to the transmitter coil 121 to generate an induced current may be installed. The receiver coil 210 may be installed inside the mobile terminal 200, and may also be installed in a protective cover or the like that externally covers the mobile terminal 200.

The near field communication (NFC) tag 130 is one of the radio frequency identification technologies and is a contactless communication technology that uses a frequency band of 13.56 MHz and transmits and receives various wireless data at a close distance of within 10 cm. NFC has a short communication range, thus providing relatively high security and is inexpensive, and thus is drawing attention as next-generation near field communication technology.

The NFC tag 130 consists of the chip 133, which is very small, and the antenna 131 for transmitting/receiving data, and the antenna 131 generates an induced electromotive force in response to an RF signal transmitted from the tag recognition unit 220 provided in the mobile terminal 200, and supplies the generated induced electromotive force to the chip 133. In addition, NFC tag information stored in the chip 133 is transmitted to the tag recognition unit 220 of the mobile terminal 200 via the antenna 131.

According to one embodiment of the present invention, the NFC tag information may be URL information of a homepage, and content provided in the URL information may include at least one piece of content selected from predetermined videos, music, predetermined text information (business card information, addresses, contact numbers, disease names of the elderly with Alzheimer, and the like), predetermined voice information, predetermined advertisement information, menu information of a store with the cradle device installed therein, event information provided by a store, and event information provided by a store in a region where the mobile terminal 200 is located. Thus, a manager who installs a cradle device may provide users with various marketing strategies via content provided in the NFC tag information. In addition, the NFC tag information may include various instruction information for controlling the mobile terminal 200. In addition, the NFC tag information may include text information (business card information, addresses, contact numbers, disease names of the elderly with Alzheimer, and the like) and voice information, and the tag recognition unit 220 of the mobile terminal 200 may recognize test information, voice information, and the like included in the NFC tag information and display the recognized information via the mobile terminal 200. For example, when a tag is recognized via the mobile terminal 200, business card information included in the NFC tag information may be directly displayed on a display of the mobile terminal 200.

According to one embodiment of the present invention, a user may perform quick member registration via a website provided in the URL information, and may earn points after completion of an advertisement provided via a website. In addition, the website may also include an electronic ordering function through the website, a function of informing a user that a menu item ordered by a user is ready, or the like.

The tag recognition unit 220 embedded in the mobile terminal 200 may be controlled such that an NFC tag reader function is turned on or off by user setting. Thus, in a case in which a user turns off the NFC tag reader function, although the mobile terminal 200 rests on the cradle device 100 of the present invention, the mobile terminal 200 is unable to receive NFC tag information transmitted from the NFC tag 130.

In this case, when a manager installs a cradle device including a wireless charging function in a store to provide store or advertisement information or the like via the NFC tag information, there is a problem of being unable to provide a user with content via an NFC tag even when a user uses the wireless charging function.

Therefore, to address the above-described problems, the wireless charging module 120 of the present invention includes the switching unit 125 configured to control connection between the transmitter coil 121 and the external power supply 10. The switching unit 125 of the present invention is controlled by the controller 123, and the controller 123 controls the switching unit 125 to be turned on upon receiving a tag recognition signal from the NFC tag 130, so that power supplied by the external power supply 10 is transmitted to the transmitter coil 121.

In this regard, the tag recognition signal may be an induced electromotive force signal generated from the antenna 131 of the NFC tag 130 in response to an RF signal transmitted from the tag recognition unit of the mobile terminal 200. To receive the induced electromotive force generated by the antenna 131, the controller 123 and the antenna 131 may be electrically connected to each other.

That is, according to the present invention, when the mobile terminal 200, in which the NFC reader function is turned on, is seated on the holder part 110, the antenna 131 of the NFC tag 130 generates an induced electromotive force and transmits the induced electromotive force to the controller 123, and the controller 123 having received the induced electromotive force controls the switching unit 125 to be turned on so that power of the external power supply 10 is transmitted to the transmitter coil 121. Accordingly, wireless charging of the mobile terminal 200 may be performed, and the mobile terminal 200 may perform an operation according to the NFC tag information provided by the NFC tag.

On the other hand, when the mobile terminal 200, in which the NFC reader function is turned off, is seated on the holder part 110, an induced electromotive force is not generated in the antenna 131 of the NFC tag 130, and thus the controller 123 controls the switching unit 125 to be turned off, and power is not transmitted to the transmitter coil 121 via the external power supply 10, and thus wireless charging of the mobile terminal 200 is not performed.

That is, the cradle device 100 of the present invention provides a wireless charging function only when the mobile terminal 200, in which the NFC reader function is turned on, is seated, and thus, to provide a user with a wireless charging function, the NFC reader function has to be turned on, and accordingly, a manager who installs the cradle device 100 may transmit, to the mobile terminal 200, various pieces of content information for marketing included in the NFC tag information, along with the wireless charging function.

Thus, a message stating "Activate NFC and Place in Position" may be provided together in the cradle device 100 of the present invention.

As described above, the controller 123 of the present invention controls the switching unit 125 to be turned on upon receiving a tag recognition signal from the antenna of the NFC tag 130. However, when the tag recognition unit 220 of the mobile terminal does not transmit the RF signal to the antenna 131 after receiving NFC tag information from the NFC tag 130, the controller 123 controls the switching unit 125 to be turned off, and in this case, wireless charging of the mobile terminal 200 may not be performed.

Thus, a predetermined period of time after the controller 123 controls the switching unit 125 to be turned on, the controller 123 may control the switching unit 125 to be turned off.

According to one embodiment of the present invention, the cradle device 100 may further include, at one side of a portion of the holder part 110 on which the mobile terminal 200 is seated, a seating recognition unit 115 configured to recognize whether or not the mobile terminal is seated. The seating recognition unit 115 may recognize whether or not the mobile terminal 200 is seated, through a pressure sensor for checking a load of the mobile terminal 200, or may recognize whether or not the mobile terminal 200 is seated, according to a pressing operation of the seating recognition unit 115.

In this case, after the controller 123 controls the switching unit 125 to be turned on, a tag recognition signal is not transmitted from the NFC tag, and when the seating recognition unit 115 recognizes that the mobile terminal 200 is not seated, the controller 123 may control the switching unit 125 to be turned off.

Thus, while the mobile terminal 200 is wirelessly charged, even when the tag recognition unit 220 of the mobile terminal 200 does not transmit an RF signal to the antenna of the NFC tag 130, a user may constantly perform wireless charging of the mobile terminal 200. According to one embodiment of the present invention, the cradle device 100 may further include the speaker 140, and the speaker 140 may be driven by the induced electromotive force generated from the antenna 131 of the NFC tag 130. At this time, a predetermined melody may be replayed via the speaker 140.

In addition, the speaker 140 may be a speaker 140 including a Bluetooth function, and in this case, the NFC tag information transmitted to the mobile terminal 200 may include Bluetooth speaker automatic connection information. That is, in the mobile terminal 200, a Bluetooth connection to the speaker 140 may be automatically performed through a Bluetooth speaker automatic connection instruction included in the NFC tag information.

According to one embodiment of the present invention, the cradle device 100 may further include the LED 150, and the LED 150 may be driven by the induced electromotive force generated from the antenna 131 of the NFC tag 130. The LED 150 may provide the cradle device 100 with a visual illumination effect, and illumination may be provided to "MENU TV" carved in an outer surface of the cradle device of FIG. 1 and the background of the letters, thereby providing a visual effect emphasizing the phrase.

A support part 113 is placed on a rear surface of the cradle device 100 of FIGS. 1 to 5 such that the holder part 110 stands at a certain angle, but the present embodiment is provided for illustrative purposes only, and a holder part, a wireless charging module, an NFC tag, and the like of the present invention may also be embedded in an upper side of a store table or the like.

While the present invention has been described with reference to the limited embodiments and the drawings along with specific items such as particular elements and the like, the embodiments set forth herein are provided only to aid in overall understanding of the present invention, and are not intended to limit the scope of the present invention. In addition, from the foregoing description, it will become apparent to those of ordinary skill in the art to which the present invention pertains that various changes and modification can be made. Thus, the scope of the present invention should not be construed as being limited by the described embodiments, and the scope of the following claims and all modifications equivalent or equal to the claims should be construed as being within the scope of the present invention.

The invention claimed is:

1. A cradle device comprising:
a holder part configured to hold a mobile terminal;
a wireless charging module provided in the holder part, and comprising a transmitter coil, a switching unit configured to switch connection paths between an external power supply and the transmitter coil, and a controller configured to control the switching unit; and
an NFC tag coupled to the wireless charging module, the NFC tag storing NFC tag information,
wherein the controller controls the switching unit to be turned on upon receiving a tag recognition signal from the NFC tag,
wherein the tag recognition signal is an induced electromotive force signal generated from an antenna of the NFC tag in response to an RF signal transmitted from a tag recognition unit of the mobile terminal, wherein the tag recognition unit of the mobile terminal is controlled such that an NFC tag reader function is selectively turned on by user setting to generate the RF signal and read the NFC tag information stored in the NFC tag,
wherein the cradle device further comprises, at one side of the holder part, a seating recognition unit configured to recognize whether or not the mobile terminal is seated through a pressure sensor for checking a load of the mobile terminal,
wherein after the switching unit is controlled to be turned on, when the tag recognition signal is not transmitted from the NFC tag, and the seating recognition unit recognizes that the mobile terminal is not seated, the controller controls the switching unit to be turned off, and
wherein after the switching unit is controlled to be turned on, when the tag recognition signal is not transmitted from the NFC tag, the controller controls the switching unit to be turned off after a predetermined period of time.

2. The cradle device of claim 1, wherein the NFC tag information recognized by the tag recognition unit of the mobile terminal comprises at least one piece of URL information of a website, text information, and voice information, and content provided in the URL information comprises at least one piece of content selected from predetermined videos, music, predetermined text information, predetermined voice information, predetermined advertisement information, menu information of a store in which the cradle device is installed, event information provided by a store, and event information provided by a store in a region where the mobile terminal is located.

3. The cradle device of claim 1, further comprising an LED configured to emit light by an induced electromotive force generated from the antenna of the NFC tag.

4. The cradle device of claim 1, further comprising a speaker operated by an induced electromotive force generated from the antenna of the NFC tag.

* * * * *